United States Patent
Saurabh et al.

(10) Patent No.: US 11,449,478 B2
(45) Date of Patent: Sep. 20, 2022

(54) BLOCKCHAIN IMPLEMENTED DATA MIGRATION AUDIT TRAIL

(71) Applicant: KYNDRYL, INC., New York, NY (US)

(72) Inventors: Kumar Saurabh, Bangalore (IN); Gururajan Sundaramurthy, Chennai (IN); Susheel Gooly, Singapore (SG)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/065,555

(22) Filed: Oct. 8, 2020

(65) Prior Publication Data
US 2022/0114150 A1    Apr. 14, 2022

(51) Int. Cl.
*G06F 16/21*   (2019.01)
*G06F 16/25*   (2019.01)
(Continued)

(52) U.S. Cl.
CPC ........ *G06F 16/214* (2019.01); *G06F 16/2358* (2019.01); *G06F 16/254* (2019.01);
(Continued)

(58) Field of Classification Search
CPC .. G06F 16/214; G06F 16/2358; G06F 16/254; G06F 16/256; H04L 9/0643; H04L 67/1002; H04L 2209/38
See application file for complete search history.

(56) References Cited

U.S. PATENT DOCUMENTS 10,637,666 B1    4/2020  Blankstein
2009/0016534 A1  1/2009  Ortiz Cornet
(Continued)

FOREIGN PATENT DOCUMENTS

WO    2019231954 A1    12/2019

OTHER PUBLICATIONS

Kalis, Rosco, "Using blockchain to validate audit trail data in private business applications", Bachelor Informatica, University of Amsterdam, Jun. 8, 2018, 45 pages.
(Continued)

*Primary Examiner* — Cam Y T Truong
(74) *Attorney, Agent, or Firm* — Ken Han; Andrew M. Calderon; Roberts Calderon Safran & Cole, P.C.

(57) ABSTRACT

Computer-implemented methods, systems and computer program products leveraging blockchain networks to securely store a tamper-proof ledger comprising an audit trail describing the completion or missed data migration tasks, based on a timeline of an end-to-end data migration task schedule. Each of the event logs and alerts from the data migration source, data migration target, and/or migration tools, including network device logs, operating system logs, user-access logs, alerts, migration tool output etc. associated with the end-to-end migration tasks is made a part of the audit trail and stored to the ledger of the blockchain. All event logs, alert or other digital assets recorded to blocks of the blockchain can be timestamped, hashed and distributed across all nodes of the blockchain network and verified as valid by each of the peer nodes. As blocks updating the audit trail are added to the blockchain, the entries cannot be modified or tampered with.

20 Claims, 9 Drawing Sheets

(51) Int. Cl.
*H04L 9/06* (2006.01)
*G06F 16/23* (2019.01)
*H04L 67/1001* (2022.01)
*H04L 9/00* (2022.01)

(52) U.S. Cl.
CPC .......... *G06F 16/256* (2019.01); *H04L 9/0643* (2013.01); *H04L 67/1001* (2022.05); *H04L 9/50* (2022.05)

(56) References Cited

U.S. PATENT DOCUMENTS

| | | | |
|---|---|---|---|
| 2010/0293412 A1* | 11/2010 | Sakaguchi | G06F 11/0715 |
| | | | 714/17 |
| 2014/0359053 A1* | 12/2014 | Bhattacharya | H04L 67/1097 |
| | | | 709/217 |
| 2017/0345011 A1* | 11/2017 | Salami | G06Q 20/42 |
| 2018/0285432 A1* | 10/2018 | Das | G06N 20/00 |
| 2019/0266139 A1* | 8/2019 | Kumarasamy | G06F 16/2452 |
| 2020/0058007 A1 | 2/2020 | Karame | |
| 2020/0142965 A1* | 5/2020 | Weldemariam | G06F 16/214 |
| 2020/0159891 A1* | 5/2020 | Patel | H04L 9/3239 |
| 2021/0075623 A1* | 3/2021 | Petersen | H04L 9/0618 |
| 2021/0271509 A1* | 9/2021 | Shi | H04L 9/3239 |
| 2021/0319441 A1* | 10/2021 | Knobel | G06Q 20/36 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

BLOCKCHAIN IMPLEMENTED DATA MIGRATION AUDIT TRAIL

BACKGROUND

The present disclosure relates generally to the field of blockchain storage, and more specifically to implementing blockchain to securely store auditing trails describing data migration between data centers, computer networks and/or cloud-based networks.

Data migration may refer to a process of moving data from one location to another, one format to another, or one application to another. Migration of data is generally a result of introducing new systems and/or locations for the data, while application migration or consolidation may be driven by business decisions that seek to replace or augment legacy systems with new applications that may share the same dataset. Currently, trends in data migration suggest that enterprises are beginning to migrate data from on-premises infrastructure, data centers, and applications, to cloud-based storage, services and application delivery mechanisms. Some types of migration may include application migration, cloud migration and storage migration. Application migration may refer to moving application programs from one environment to another, from on-premises IT centers to a cloud, moving between clouds (private, public and/or hybrid), or moving applications' underlying data to a new form of application hosted by a software provider. Similarly, cloud migration may refer to the process of moving data, applications or other business elements from either on-premises data centers to a cloud or from one cloud to another cloud. Lastly, storage migration may comprise moving data off existing storage arrays into new storage arrays.

SUMMARY

Embodiments of the present disclosure relate to a computer-implemented method, an associated computer system and computer program product for implementing a blockchain controlling access to a ledger comprising an audit trail containing digital assets describing tasks associated with performance of a data migration event. The computer-implemented method comprises: creating, by the processor, a task list configured to delegate one or more tasks for migrating data from a data migration source to a data migration target; assigning, by the processor, the one or more tasks to at least one party responsible for performance of an assigned task to complete the migrating of the data from the data migration source to the data migration target; performing, by the processor, the assigned task; logging, by the processor, as a function of performing the assigned task, details corresponding to performance of the assigned task, to a digital asset; recording, by the processor, the digital asset as a block of a blockchain; and distributing, by the processor, the block of the blockchain describing the performance of the assigned task for migrating from a data migration source to a data migration target to all nodes of a blockchain network, wherein said block recorded to the blockchain updates the blockchain-implemented data migration audit trail.

BRIEF DESCRIPTION OF THE DRAWINGS

The drawings included in the present disclosure are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1:
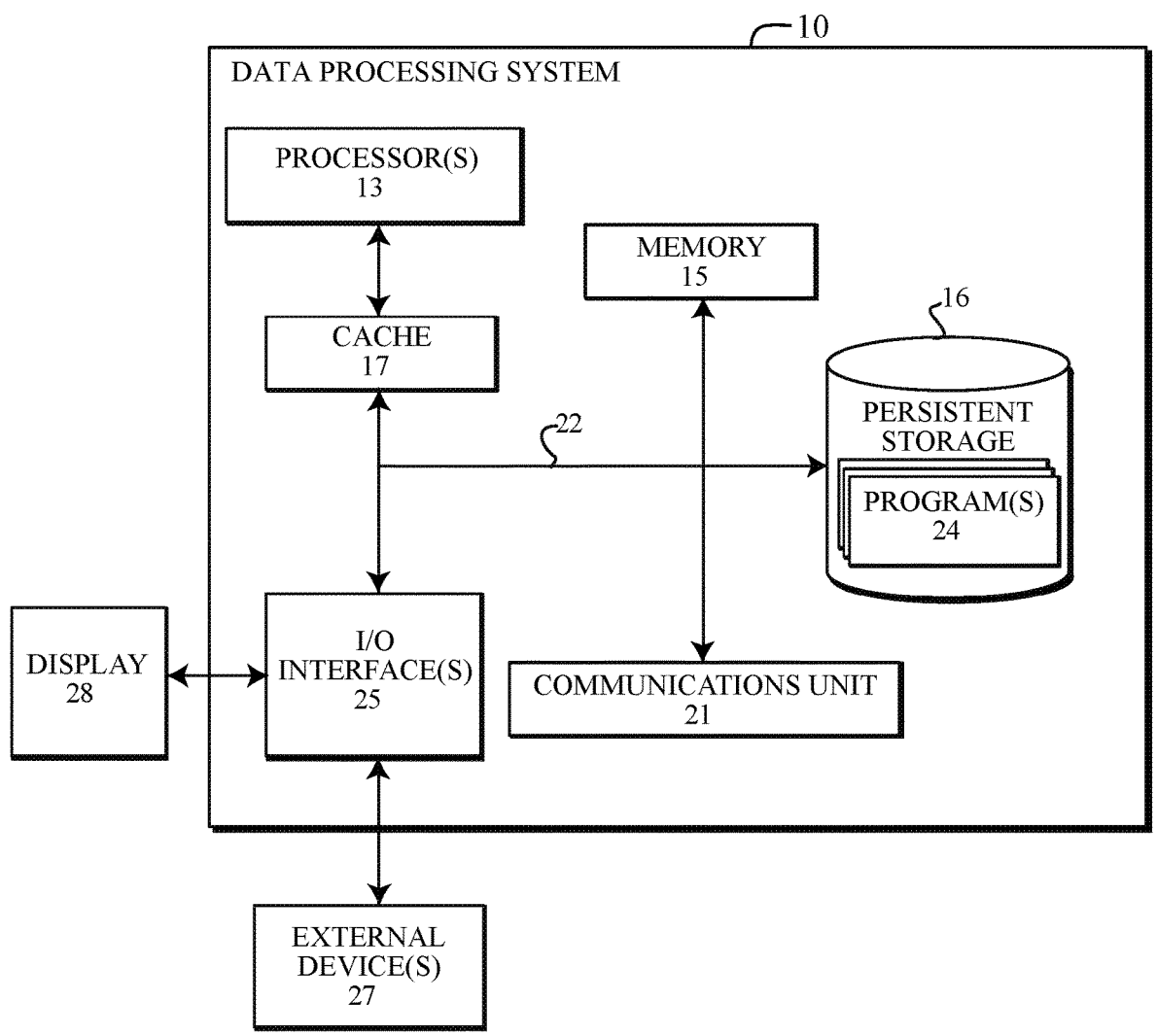
FIG. 1 depicts an embodiment of a block diagram of internal and external components of a data processing system, in which embodiments described herein may be implemented, in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Data migration programs, which may migrate hundreds of applications and workloads between legacy datacenters and/or cloud networks (public or private), may involve hundreds of tasks (or more) to be performed by a plurality of stakeholders. These stakeholders can be part of different entities, groups, organizations, enterprises or companies and may often need to work together to complete the end-to-end tasks associated with a data migration event. Stakeholders may be part of application teams that may be customers and/or service providers, third party migration teams performing one or more migration services between a data migration source (such as a datacenter or cloud network) and a data migration target as well as infrastructure teams associated with managing the data migration target and management teams for the customers and/or service providers.

Embodiments of the present disclosure recognize that current data migration procedures may involve manually tracking and updating timelines for completing one or more migration tasks, allowing for one or more stakeholders to look back at executed tasks within the planned timeline, verify the completion of tasks and manually update the timelines. However, embodiments of the present disclosure further recognize key security challenges associated with stakeholders auditing the execution of data migration tasks, when the process is manually performed by multiple stakeholders involved with the end-to-end data migration tasks. As a result of multiple stakeholders, which may be part of different entities, companies, organizations, etc., there may be no single trusted source available to all of stakeholders that may help everyone involved in the data migration understand the completion progress and timelines for all of the end-to-end migration tasks. With multiple stakeholders from a plurality of different affiliations, inputting data into the planned migration timelines, the one or more files tracking the execution of the end-to-end data migration tasks can be prone to trust issues, manipulation and error. As a result, auditors tracking the progress of end-to-end migration of the data may be left with a poorly prepared audit trail, without a single source of trustworthy tracking information available for monitoring or understanding the completion of the end-to-end migration tasks.

Embodiments of the present disclosure recognize the need for a secured, tamper-proof audit trail that stakeholders can use and trust while reviewing the end-to-end migration of data and for monitoring the progress of the data migration tasks. Embodiments of the present disclosure leverage the use of blockchain to create a securely stored, tamper-proof ledger comprising the audit trail, wherein the audit trail being created and updated describes the completion of end-to-end migration tasks. The audit trail may be accessible to stakeholders responsible for auditing the completion of the data migration, in order to track the tasks being completed in the scheduled manner and to ensure fulfill the performance requirements of the data migration. Each of the event logs, records and alerts from the data migration source's or target's servers, including network device logs, operating system logs, user-access logs etc. associated with the end-to-end migration tasks as well as output from data migration tool, can be made a part of the audit trail and stored to the blocks of the blockchain network. An example of a blockchain network may include a peer-to-peer (p2p) network. All event logs, alert or other assets recorded as blocks to the blockchain can be timestamped, hashed and stored across all nodes of the blockchain network. As entries are added as blocks to the blockchain, the entries are verified by each of the nodes of the blockchain network as being valid and blocks added to the blockchain network cannot be modified or tampered with.

The one or more digital assets that may comprise the audit trail can be forwarded from respective monitoring servers, logging servers and/or output from migration tools toward nodes of a blockchain network being utilized by a blockchain platform using an application programming interface (API) functionality to execute application code to implement one or more blockchain transactions. Administrators and/or auditors responsible for tracking the progress of the tasks can access and audit the blocks of the audit trail via the blockchain platform, query the ledger(s) containing the audit trail, perform further analysis and/or use one or more blockchain applications and/or generate user-friendly reports from the ledger information. Generated reports may be viewable by clients connected to the blockchain platform, the clients connected to the data migration sources or data migration targets and/or other stakeholders, in order to display task progression to all teams or groups participating in the end-to-end data migration tasks. Accordingly, allowing for all participants and auditors of the end-to-end migration to observe a single, untampered, source describing the entire flow of the end-to-end migration events.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 10, which may be a simplified example of a computing system capable of performing one or more computing operations described herein. Data processing system 10 may be representative of the one or more computing systems or devices depicted in computing environment 200, 240, 300, 500, 550, as shown in FIGS. 2A-6, and in accordance with the embodiments of the present disclosure described herein. It should be appreciated that FIG. 1 provides only an illustration of one implementation of a data processing system 10 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 10, a data processing system 10 may take many different forms, including real, virtualized and containerized forms. For example, data processing system 10 can take the form of personal desktop computer systems, laptops, notebooks, tablets, servers, clients, network devices, terminals, thin clients, thick clients, kiosks, mobile communication devices (e.g., smartphones), augmented reality (AR) devices, virtual reality (VR) headsets, multiprocessor systems, microprocessor-based systems, minicomputer systems, mainframe computer systems, smart devices (i.e. smart glasses, smartwatches, etc.), Internet-of-Things (IoT) devices, etc. The data processing systems 10 can operate in a networked computing environment, virtual computing environment, containerized computing environment, a distributed cloud computing environment, a serverless computing environment, and/or a combination of environments thereof, which can include any of the systems or devices described herein and/or additional computing devices or systems known or used by a person of ordinary skill in the art.

Data processing system 10 may include communications fabric 22, which can provide for electronic communications between one or more processor(s) 13, memory 15, persistent storage 16, cache 17, communications unit 21, and one or more input/output (I/O) interface(s) 25. Communications fabric 22 can be implemented with any architecture designed for passing data and/or controlling information between processor(s) 13, memory 15, cache 17, external devices 27, and any other hardware components within a data processing system 10. For example, communications fabric 22 can be implemented as one or more buses.

Memory 15 and persistent storage 16 may be computer-readable storage media. Embodiments of memory 15 may include random access memory (RAM) and cache 17 memory. In general, memory 15 can include any suitable volatile or non-volatile computer-readable storage media and may comprise firmware or other software programmed into the memory 15. Software program(s) 24, applications 107a, 107b (referred to herein generally as "applications 107"), workloads 109a, 109b (referred to herein generally as "workloads 109") and services described herein may be stored in memory 15, cache 17 and/or persistent storage 16 for execution and/or access by one or more of the respective processor(s) 13 of the data processing system 10.

Persistent storage 16 may include a plurality of magnetic hard disk drives. Alternatively, or in addition to magnetic hard disk drives, persistent storage 16 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 16 can also be removable. For example, a removable hard drive can be used for persistent storage 16. Other examples include optical and magnetic disks, thumb drives, and smart cards that are inserted into a drive for transfer onto another computer-readable storage medium that is also part of persistent storage 16.

Communications unit 21 provides for the facilitation of electronic communications between data processing systems 10. For example, between one or more computer systems or devices via a communication network. In the exemplary embodiment, communications unit 21 may include network adapters or interfaces such as a TCP/IP adapter cards, wireless Wi-Fi interface cards or antenna, 3G, 4G, or 5G cellular network interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks' devices, systems, hosts, terminals or other network computer systems. Software and data used to practice embodiments of the present invention can be downloaded to the computer systems operating in a network environment through communications unit 21 (e.g., via the Internet, a local area network or other wide area networks). From communications unit 21, the software and the data of program(s) 24, applications 107, workloads 109 or services can be loaded into persistent storage 16, stored within memory 15 and/or cache 17.

One or more I/O interfaces 25 may allow for input and output of data with other devices that may be connected to the data processing system 10. For example, I/O interface 25 can provide a connection to one or more external devices 27 such as one or more, IoT devices, recording devices such as an audio recording devices, microphones, cameras, one or more sensors, input devices such as a keyboard, computer mouse, touch screen, virtual keyboard, touchpad, pointing device, or other human interface devices. External devices 27 can also include portable computer-readable storage media such as, for example, thumb drives, portable optical or magnetic disks, and memory cards. I/O interface 25 may connect to human-readable display device 28. Display device 28 provides a mechanism to display data to a user and can be, for example, a computer monitor, screen, television, projector, display panel, etc. Display devices 28 can also be an incorporated display and may function as a touch screen as part of a built-in display of a tablet computer or mobile computing device.

System for Executing a Blockchain-Implemented Data Migration Audit Trail

Aspects of the present disclosure relate generally to the field of blockchain storage, and more specifically to implementing blockchain to securely transfer evidence describing the completion of one or more tasks associated with end-to-end data migration, including evidence provided by application logs, operating system logs, user access logs, network device logs and/or migration tools or other event records (referred to herein collectively as "assets" or "digital assets") to blocks of a blockchain network, creating a secure ledger comprising audit trail 129, trusted by each stakeholder performing one or more task of the end-to-end migration process. As the end-to-end migration process continues and ultimately completes the transfer of data between networks, data centers, private and/or public clouds, the administrators and/or auditors responsible for overseeing and/or reviewing the completion of end-to-end migration task 111 can access the audit data stored to the audit trail 129 over the blockchain network 130 by querying the ledger stored by peer nodes 104-110 of the blockchain network 130. Auditors and administrators can review the progress of the data migration, track the progress of one or more responsible parties assigned one of more of the tasks, analyze any errors and securely verify that the transfer of date is successfully being performed.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may be used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein are a method, system, and computer program product that utilize blockchain/Hyperledger fabric to securely create an audit trail 129 describing the progress and/or completion of one or more end-to-end data migration tasks 111 performed during migration of data between one or more migration data sources such as source datacenter 101 or cloud networks 250 (public or private), data migration targets such as target datacenter 125, or cloud network 250. Referring to the drawings, FIGS. 2A-6 depict an approach that can be executed using one or more data processing systems 10 operating within a computing environment 200, 240, 300, 500, 550 and variations thereof, to implement systems, methods, and computer program products of a blockchain-implemented data migration audit trail 129. Embodiments of computing environments 200, 240, 300, 500, 550 may include one or more data processing systems 10 interconnected as part of a computing network. The interconnected data processing systems 10 communicating over the computing network may be specialized systems or devices that may include, but are not limited to, the interconnection of one or more datacenters 101, 125 comprising a logging server 103 and/or a monitoring server 105; client devices 119, 123, 127 and/or blockchain platform(s) 112 hosting blockchain nodes 102 of a blockchain network 130.

The specialized data processing systems 10 shown in FIGS. 2A-6 may not only comprise the elements of the systems and devices depicted in the drawings of FIGS. 2A-6, but the specialized data processing systems depicted in FIG. 2A-6 may further incorporate one or more elements of a data processing system 10 shown in FIG. 1 and described above. Although not shown in the figures, one or more elements of the data processing system 10 may be integrated into the embodiments of datacenters 101, 125, logging server 103a,103b, monitoring server 105a, 105b, client devices 119, 123, 127, and systems hosting blockchain platform 112 and/or the blockchain nodes 102 that make up the blockchain network 130, including (but not limited to) the integration of one or more processor(s) 13, program(s) 24, memory 15, persistent storage 16, cache 17, communications unit 21, input/output (I/O) interface(s) 25, external device(s) 27 and/or display device 28.

Figure 2A:
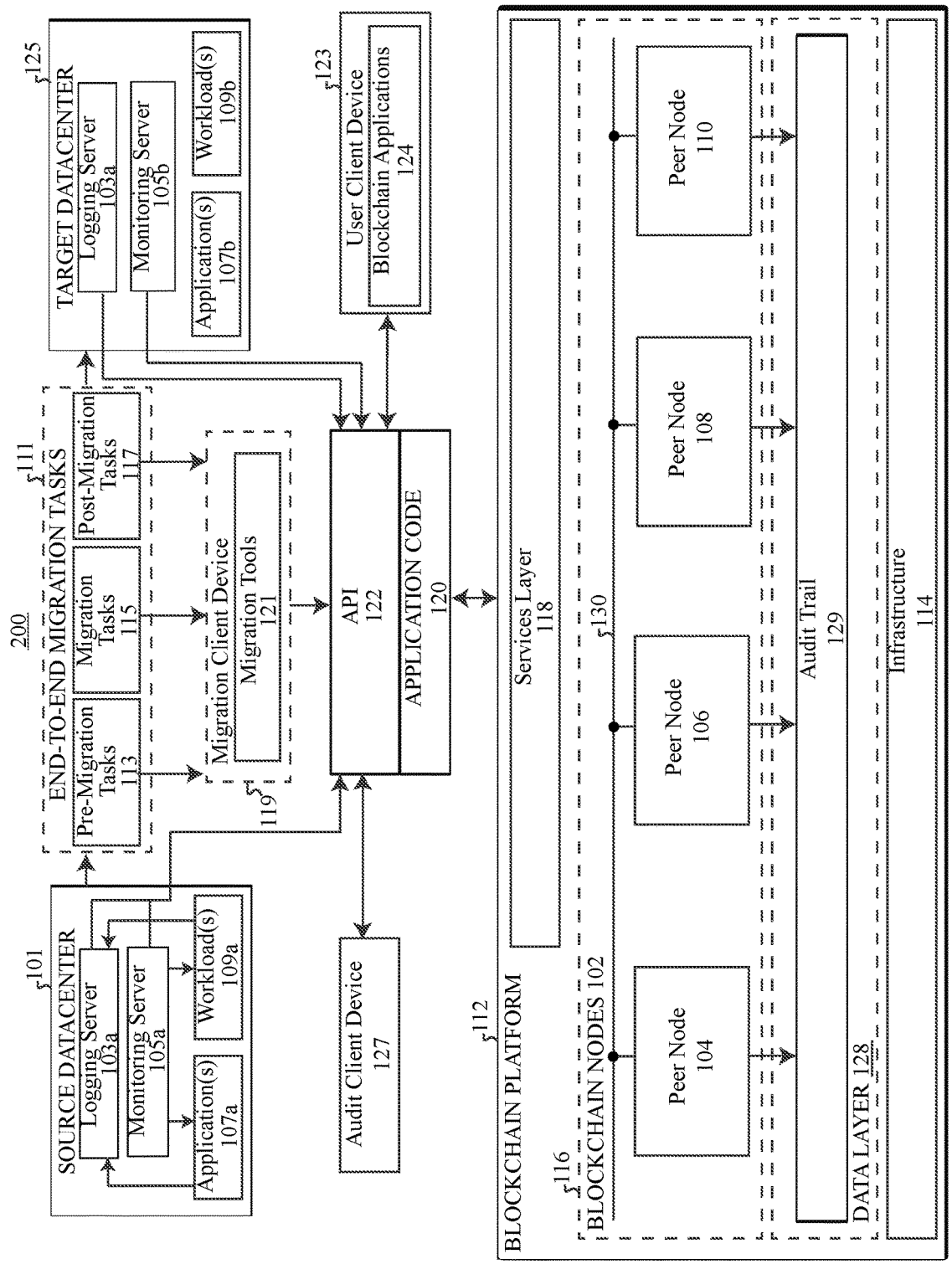
FIG. 2A depicts a block diagram of an embodiment of a computing environment for executing a blockchain-implemented data migration audit trail, in accordance with the present disclosure.
Figure 2B:
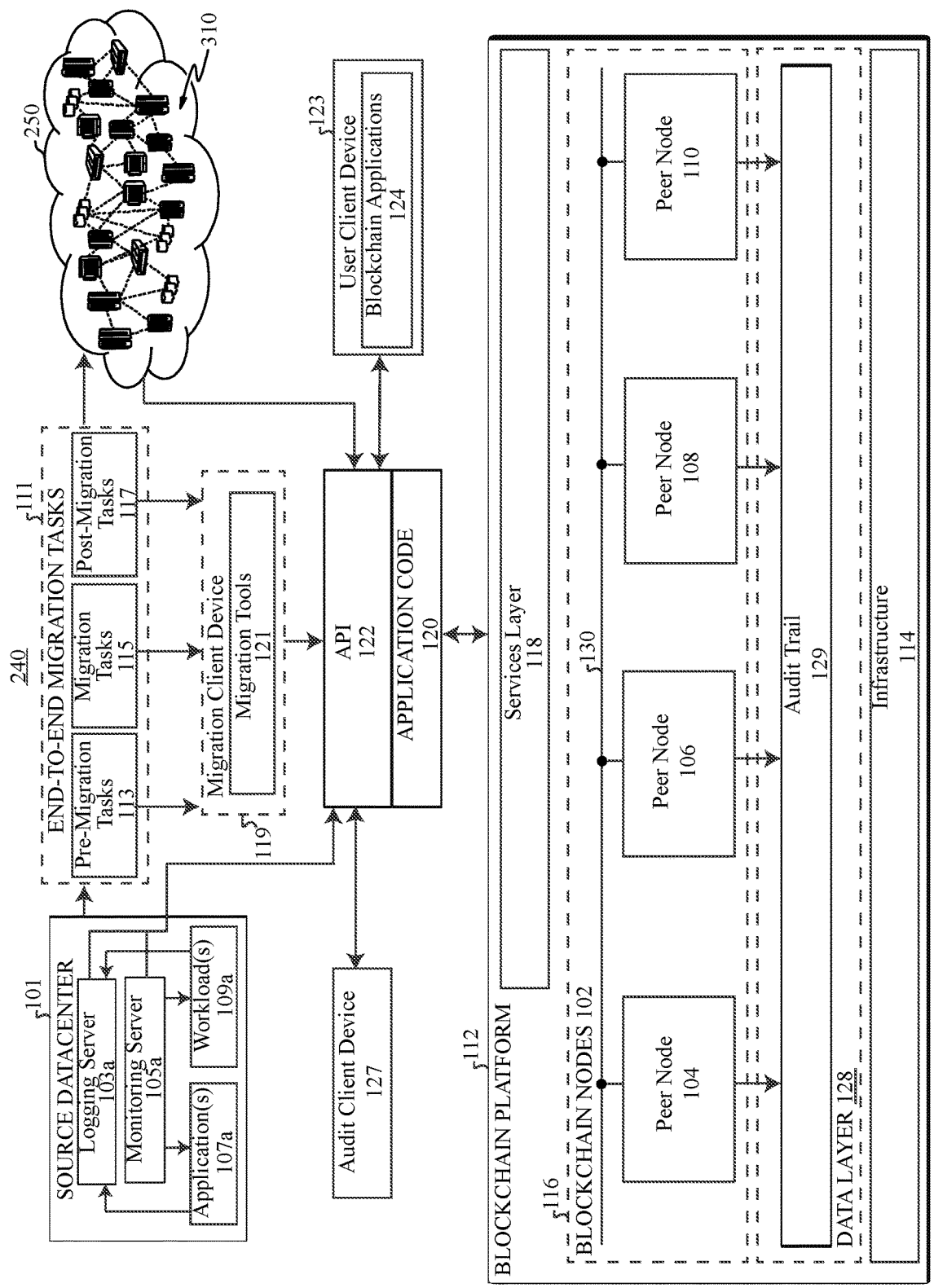
FIG. 2B depicts a block diagram of an alternate embodiment of a computing environment for implementing a blockchain-implemented data migration audit trail, in accordance with the present disclosure.

Referring to drawings, FIG. 2A-2B, depict examples of computing environments 200, 240 capable of executing a blockchain-implemented audit trail 129 for securely storing and tracking the progress of end-to-end migration tasks 111 (referred to herein also as tasks 111) as the tasks 111 are performed and completed, deadlines for completing tasks 111 are missed or result in errors and/or alerts being outputted. As shown in FIG. 2A-2B, the end-to-end migration tasks 111 may comprise tasks that may be performed as part of the data migration procedure before the data migration occurs (pre-migration tasks 113), tasks that are part of migrating the data from a data migration source to a data migration target (migration tasks 115) and tasks that may be executed following the completion of the data migration to the data migration target (post-migration tasks 117).

As shown in the embodiments of FIG. 2A-2B, examples of data migration, including the migration of one or more applications 107 and/or workloads 109, may be performed as part of: a migration from a data migration source (i.e. source datacenter 101) to a data migration target (i.e. target datacenter 125 as shown in FIG. 2A); a source datacenter 101 to a private or public cloud network 250 (as shown in FIG. 2B); and/or in some embodiments migration from a first private or public cloud network 250 to a second private or public cloud network 250.

Cloud networks 250 are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, smart devices, IoT devices, virtual assistant hubs, etc.).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a cloud network 250 of interconnected nodes 310.

Figure 3:
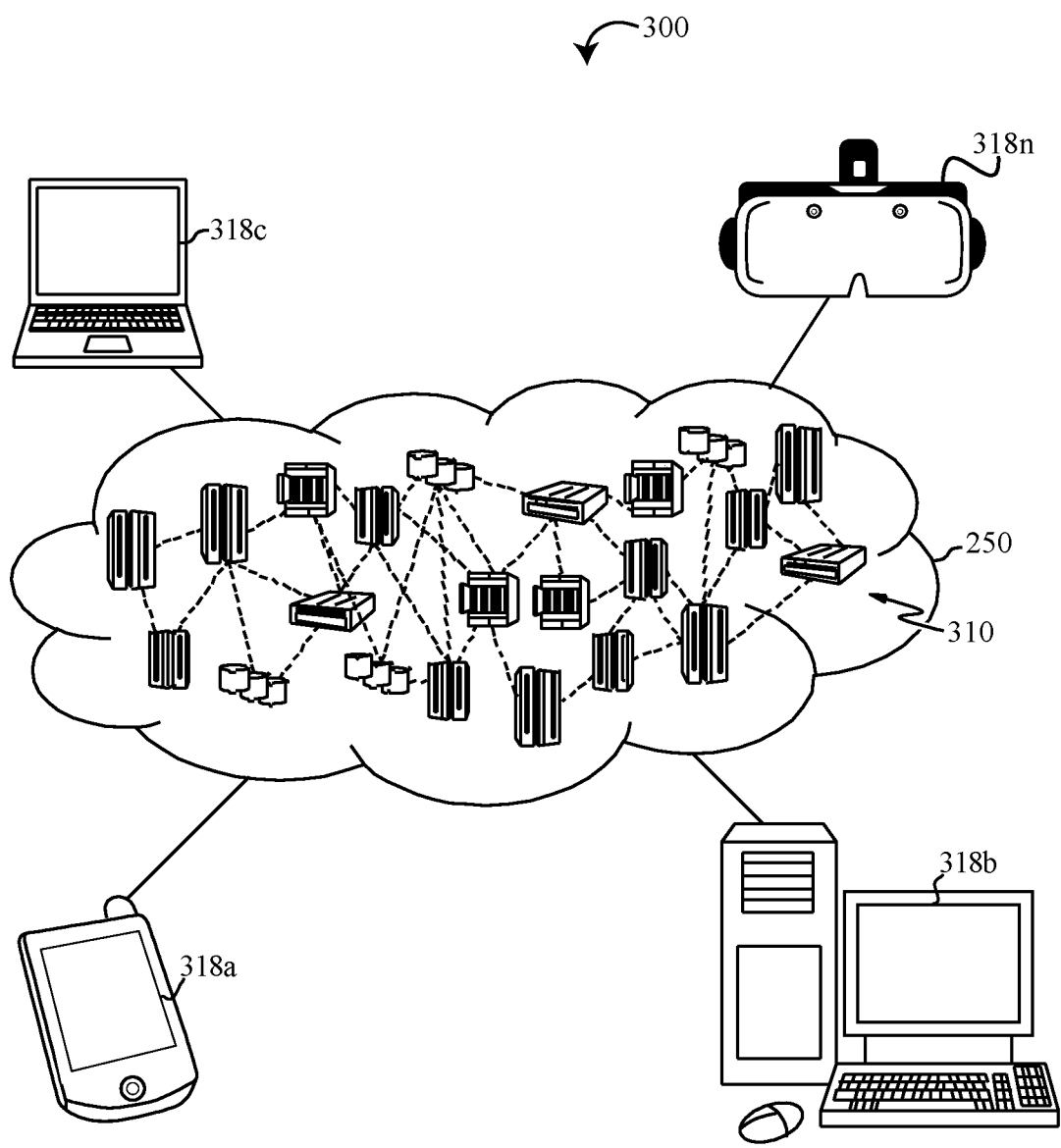
FIG. 3 depicts an embodiment of a cloud computing environment within which embodiments described herein may be implemented, in accordance with the present disclosure.

Referring to the drawings, FIG. 3 is an illustrative example of a cloud computing environment 300. As shown, cloud computing environment 300 includes one or more cloud computing nodes 310 with which customers can access using client devices operated or configured by cloud consumers. Nodes 310 of the cloud computing environment 300, such as one or more host systems or edge devices may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on the client devices 318a-318n connecting or communicating with the nodes 310 of the cloud network 250. It is understood that the types of client devices 318a-318n connected to the cloud computing environment 300 are intended to be illustrative only and that computing nodes 310 of the cloud computing environment 300 can communicate with any type of computerized device over any type of network and/or network addressable connection (e.g., using a web browser).

Figure 4:
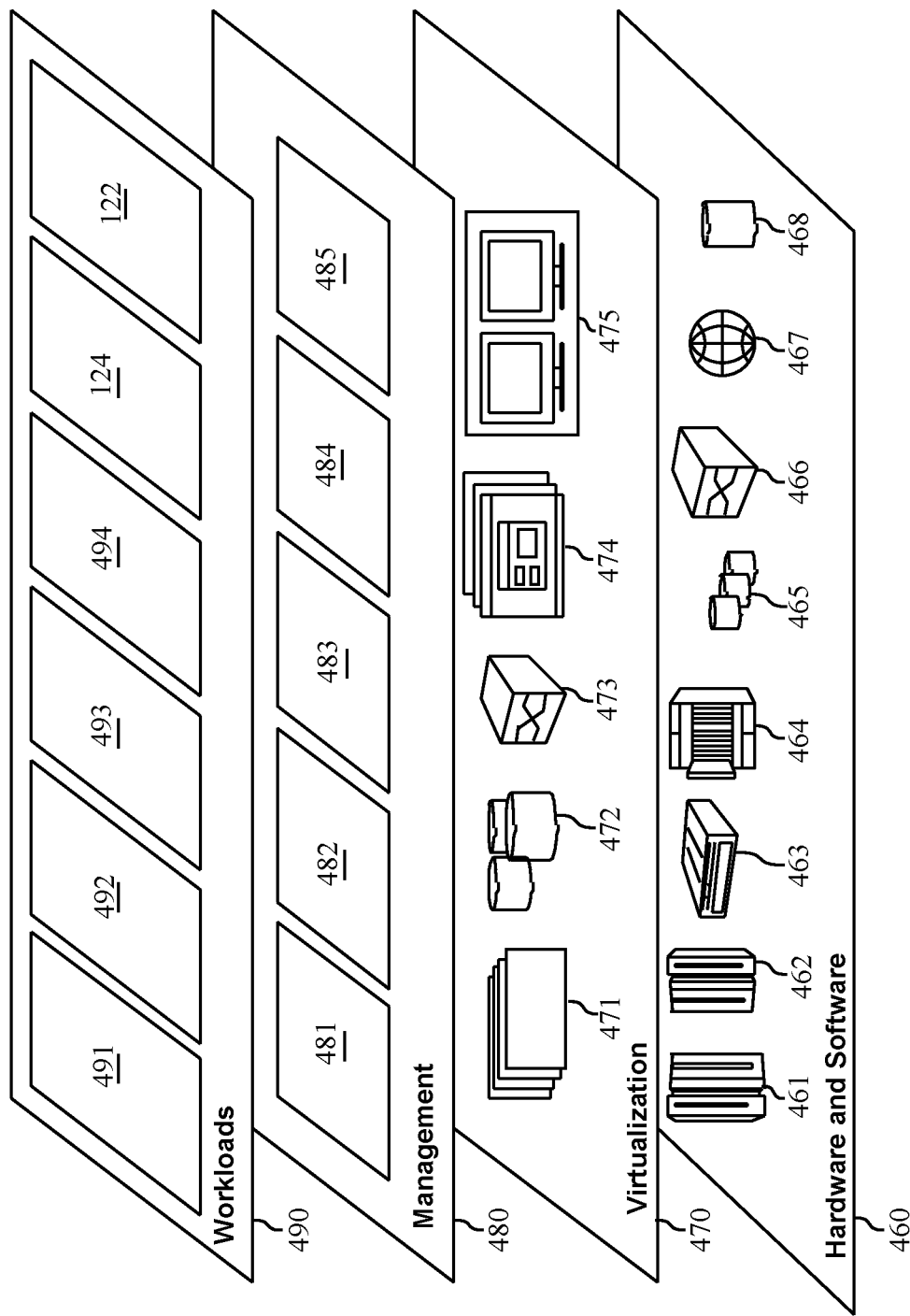
FIG. 4 depicts an embodiment of abstraction model layers of a cloud computing environment, in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 include hardware and software components. Examples of hardware components include mainframes 461; RISC (Reduced Instruction Set Computer) architecture-based servers 462; servers 463, including logging servers 103 and monitoring servers; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads 109 and functions which may be provided from this layer include software development and lifecycle management 491, data analytics processing 492, virtual classroom education delivery 493, transaction processing 494, blockchain application 124 and/or an API 122 for accessing and communicating with peer nodes 104-110 blockchain platform 112. For example, using the application 124 and/or API 122 to invoke chaincode/smart contracts (discussed in detail below) to proposed updated blocks to add to the blockchain and/or query a ledger stored by peer nodes 104-110 comprising the audit trail 129.

Referring to the drawings, FIG. 2A-2B depict block diagram examples of computing environments 200, 240 capable of creating, storing, and/or updating a ledger on a blockchain comprising an audit trail 129 using a blockchain network 130. Embodiments of an audit trail 129 may be generated for the purpose of tracking and monitoring the progress of the tasks 111 associated with migrating data from a data migration source to a data migration target. As shown in the example of computing environment 200, the computing environment 200 may comprise a data migration source (i.e. source datacenter 101) which may be storing and maintaining the data selected to be transferred or copied to another location within the computing environment and/or network. For example, the transference of one or more applications 107a, workloads 109a and virtual devices and systems hosted by the data migration source, including servers 103a, 105a, virtual devices, storage, containers, etc.

A stakeholder selecting to perform a data migration event and the complexity of the data migration event may vary depending on the type of data migration that may be occurring. For instance, in some embodiments, an owner of an application 107a or a service provider being hosted by a source datacenter 101 may be choosing to migrate applications 107a or workloads 109a and the associated data hosted by the source datacenter 101 to a new location such as target datacenter 125 or cloud network 250. In other embodiments, an owner or administrator of the migration data source, such as the owner of a source datacenter 101 may decide to upgrade data centers, migrate away from legacy systems to a public or private cloud network 250 and/or transition from a private cloud to a public cloud (or vice versa). As a result of the owner or administrator of the datacenter 101, 125 and/or cloud network 250 deciding to migrate to new infrastructure or a new location, the resulting migration may transition all applications 107*a*, workloads 109*a*, servers, virtual clients and data being hosted to the new target location.

The stakeholder requesting and/or coordinating the migration of the data from a data migration source to a data migration target may develop a schedule for completing one or more of the end-to-end migration tasks 111 in order to properly complete a migration event within particular specifications. For example, within a promised timeframe or in line with promised contractual obligations or service levels. In some embodiments, the entity coordinating the migration of data and/or scheduling the tasks 111 may be an owner, administrator or operator of the data being transferred and/or the owner, operator or administrator of the data migration source. For example, the owner, operator, or administrator of a source datacenter 101 and/or the service provider of one or more applications 107*a* and/or workloads 109*a* being hosted by a source datacenter 101. In other embodiments, the entity that may be coordinating and scheduling the completion of one or more tasks 111 may be one or more migration teams (either in-house or a third party hired to perform the end-to-end migration process). Embodiments of the tasks 111 that may be scheduled for completion may include a series of premigration tasks 113, migration tasks 115 and post migration tasks 117, a scheduled timeframe for completing the task, including a deadline, as well as a stakeholder assigned to completing each of the tasks. Examples of pre-migration tasks may include rebooting servers, preparing backups of the source datacenter's 101 storage devices, terminating the services of one or more running applications 107*a* and/or workloads 109*a*. Embodiments of migration tasks 115 may include one or more tasks that may be involved with the actual transferring of data, applications 107*a*, workloads 109*a*, and libraries, as well as processes that may be converting and/or formatting the data to meet requirements for storage and operation at the data migration target. For example, converting data stored by a database in the source datacenter 101 to a new upgraded format understood by the database engines of the target datacenter 125 receiving the database datasets during the migration of the data. Moreover, examples of post migration tasks 117 may include tasks such as validating completion of migrated data being received by the data migration target, updating permissions, updating fields to correspond to the destinations on the new data migration target, updating server names, updating dependencies, and finally testing the data migration target to ensure that errors were not made during the data migration including post-migration tasks 117 directed toward testing of the transferred applications 107*b* and/or workloads 109*b* to ensure they are initiating and operating without error.

Embodiments of the computing environment 200, 240 may comprise a plurality of systems, components, modules, services and/or programs that execute and log the performance and/or completion of the tasks 111 assigned to one or more particular stakeholders for completion, as part of the end-to-end data migration event. The performance, completion and even the failure to perform one or more tasks 111 (i.e. due to a missed deadline or errors) may be captured and logged by one or more system, component, program, etc. within the computing environment 200, 240. For example, tasks 111 may be monitored, performed, and/or logged in coordination with one or more logging servers 103*a*, 103*b*, monitoring server 105*a*, 105*b*, applications 107*a*, 107*b*, workloads 109*a*, 109*b* of either the data migration source and/or the data migration target, as well as migration tools 121, and/or client devices 119, 123, 127 executing one or more blockchain applications 124, APIs 122 or application code 120.

As a function of executing one or more tasks 111 that are scheduled or assigned to a particular entity, embodiments of the systems, components, modules, services and/or programs executing the performance of the one or more tasks 111 may create a detailed digital asset describing the execution (or attempted execution) of the tasks 111. The term "digital asset" may refer to electronic records owned, licensed or controlled by the owner or administrator of the data being created. For example, logs, alerts, or event records created by source datacenter 101 may be digital assets owned by the owner of the source datacenter 101 in some instances, or the owner/licensee of an application 107*a* or workload 109*a* creating the log or record. Embodiments of resources creating a log, alert, event record, error report or other type of file, may provide details within the file data (or metadata) describing the features of the event. For instance, the record, log, error report, or alert may comprise a task name, date and time the task was executed, date and time of task completion, the outcome of the task (i.e. was it successfully completed or failed), a list and description of any errors that occurred, along with any error codes or alerts, the system, applications 107, workloads 109, programs, migration tools 121 or other computing resources used to execute the task 111. The digital asset may be outputted and/or stored by the one or more systems, components, modules, services, applications 107, workloads 109, programs (referred to generally as "resources") executing the performance of the one or more tasks 111. Embodiments of the resources executing the performance of one or more tasks 111 may automatically and/or periodically establish a connection with the blockchain platform 112 via an API 122 and/or blockchain application(s) 124 and request to update a ledger comprising the audit trail 129 with one or more files comprising the digital assets describing the execution and performance of the end-to-end migration tasks 111 to one or more peer nodes 104-110 of the blockchain platform 112. Embodiments of the peer nodes 104-110 each host instances of one or more blockchain ledgers and may include chaincode (also referred to as a smart contract and described in detail below) which can access the blockchain's ledger (i.e. audit trail 129). Interfacing with the chaincode occur with via API 122 executing application code 120. For example, auditors of the end-to-end migration tasks 111 may run chaincode via API 122 to query the ledger and/or migration tools 121 or chaincode can be executed via API 122 to update the ledger of a peer node. In some embodiments, each of the resources may also backup and store the digital assets detailing and describing the execution of the one or more tasks 111 to a localized repository or database and/or a network-accessible repository or database, which may be accessible outside of the blockchain platform 112.

As noted above, one of the resources that may be creating a digital asset upon the execution and performance of one or more tasks 111 may be a logging server 103*a*, 103*b*. Embodiments of the logging server 103 may refer to a computer (real or virtual) or computer program that may manage and serve log data and event records related to the state of a computer system from which the log data is collected. For example, logging server 103a manages and serves log data and event records describing the state of source datacenter 101, including logs and event records describing the actions of one or more applications 107a and workloads 109a of the source datacenter 101. Embodiments of the logging server 103a may additionally selectively store and archive records of the events and logs being tracked by the logging server 103a, ensure security and confidentiality of the stored logs, control log and event record quality by analyzing and/or adding missing information to the logs and contextualize events recorded by the logs, including recording information about the IP address that generated the log or event record, user information, one or more features of the system being accessed, and any error details or alerts that may be triggered as part of the log or event occurring.

Another type of resource that may be creating digital assets contributing to the audit trail 129 of the end-to-end tasks 111 in response to the execution or performance of said end-to-end migration tasks 111, may include a monitoring server 105a, 105b. Embodiments of the monitoring server 105 may be a computer system (real or virtual) or computer program responsible for supervising applications 107 and workloads 109 and provide a global view of the applications 107 and workloads 109 at a given moment, as well as a history of past states of the application 107 or workload 109, including: performance and/or response time of the application or workload's resources; the integrity of the application 107 or workload 109; and the availability of the application 107 or workload 109. Monitoring server 105 can detect a lack of performance, the number of connections incoming to a service, application 107 or workload 109, and anomalies. The monitoring server 105 can monitor multiple elements of services, applications 107 and workloads 109, commonly referred to as "metrics". The metrics that can be monitored may include (but are not limited to) CPU load, the number of simultaneous connections, errors, simulated interactions with an application 107 or workload 109, network load (i.e. quality of service, latency, ping, etc.), and attempted connections blocked by a firewall. Supervision of the metrics by the monitoring server 105 allow for the creation of alerts that may reference or indicate significant state changes, which may be, in some instances, be the result of performing one or more tasks 111. Examples of alerts that may be created in response to the execution of one or more tasks 111 may include too high of a CPU load, a push to a repository, a build error, and too many simultaneous connections.

In some embodiments, migration tools 121 may be used to perform one or more end-to-end migration tasks 111. Migration tools 121 may be operated by one or more stakeholders via a migration client device 119 and may often be used by more than one different team that may be assigned tasks 111, such as a data migration team, management team and/or infrastructure team. Embodiments of the data migration tools 121 may be used to move applications 107a, services, libraries, servers 103a, 105a, and/or workloads 109a (collectively the "migration data") from one storage system to another, and more specifically from one or more storage systems of the data migration source to the storage system(s) of a data migration target. Data migration tools 121 may perform one or more end-to-end migration tasks 111, including migration tasks 115 through a process of selecting, preparing, extracting and/or transforming the data of the data migration source, to ensure that the form of the migration data is compatible with the new storage location of the data migration target's storage system. Embodiments of the migration tools 121 may include toolsets capable of performing data integration as well as include extract, load and transform (ETL) tools.

ETL tools, which may be part of embodiments of the migration tools 121, may be able to handle complex requirements of the end-to-end migration tasks 111, including complex migration tasks 115 of the data migration process. The ETL functionality of migration tools 121 may include tools for processing big data sets, in-depth data profiling, and integration of migration data between multiple platforms. In some embodiments, the ETL functionality of the migration tools 121 may automate standard ETL tasks such as retrieving data from operational systems, transforming the retrieved data into a unified format and load the transformed data into a destination database or storage system of the data migration target.

In some embodiments of the migration tools 121, the output of the migration tools performing one or more end-to-end migration tasks may include outputting one or more logs, alerts, errors, records and/or another type of digital asset detailing the tasks 111 performed by the migration tools 121, the one or more actions performed, results from performing the tasks 111, including an indication of success, failure, errors, etc., the date and time that the tasks were initiated and completed, as well as information describing the users performing the tasks, the IP addresses of the migration client devices 119 running the migration tools 121, the data migration source and the data migration target.

Embodiments of the digital assets, such as the logs, records, errors, alerts and events recorded and/or generated as a result of performing one or more assigned end-to-end migration tasks 111 by one or more systems, components, programs applications 107, workloads, servers 103, 105 and/or migration tools 121, may be stored as part of the audit trail 129 as one or more blocks within the data layer 128 of a blockchain or another type of decentralized database. In some embodiment, methods, systems, and/or computer programs product described herein utilize a decentralized database (such as a blockchain) that is a distributed storage system, which includes multiple nodes 102 (including peer nodes 104-110) on a block chain network 130 that communicate with each other, to create and update the data of the audit trail 129 describing the end-to-end migration of data between data migration source(s) and data migration target (s). The decentralized database may include an append-only immutable data structure resembling a distributed ledger capable of maintaining records between mutually untrusted parties. The untrusted parties are referred to herein as peer nodes 104-110 or simply as peers. Each peer 104-110 maintains a copy of the distributed ledger describing the audit trail 129, and no single peer can modify the records of the ledger without a consensus being reached among the distributed peers 104-110. For example, the peers nodes 104-110 may execute a consensus protocol to validate blockchain storage transactions storing the digital assets as blocks written to the audit trail 129, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use a consensus based on various protocols such as Proof of Work. On the other hand, a permissioned blockchain database provides secure interactions among a group of entities which share a common goal (i.e. migration of data) but which do not fully trust one another, such as businesses, entities and/or stakeholders that exchange funds, goods, (private) information, and the like to complete their goal.

Further, in some embodiment, the method, system, and/or computer program product can utilize a blockchain that operates arbitrary, programmable logic, tailored to a decentralized storage scheme and referred to as "smart contracts" or "chaincodes." Peers 104-110 may host instances of chaincodes that can be connected to applications 124 and/or APIs 122 that may execute application code to implement chaincode instructions or commands. For example, instructions to access or query the ledger of a particular peer node or update the ledger (i.e. the audit trail 129) with the consensus of the peer nodes 104-110. In some cases, specialized chaincodes may exist for management functions and parameters which are referred to as system chaincode (such as managing access to an off chain datastore/database). In some embodiments, the method, system, and/or computer program product can further utilize smart contracts that are trusted distributed applications which leverage tamper-proof properties of the blockchain database and an underlying agreement between nodes 102, which is referred to as an endorsement or endorsement policy. Blockchain transactions, associated with this application can be endorsed before being committed to the blockchain, while transactions, which are not endorsed, are disregarded.

An endorsement policy allows chaincode to specify endorsers for a transaction in the form of a set of peer nodes 104-110 that are necessary for endorsement. When a client node of the blockchain network 130 sends the transaction to the peers 104-110 specified in the endorsement policy, the transaction is executed to validate the transaction. After validation, the transactions enter an ordering phase in which a consensus protocol is used to produce an ordered sequence of endorsed transactions grouped into blocks.

In some embodiment, the method, system, and/or computer program product can utilize nodes 102 that are the communication entities of the blockchain system. A "node" may perform a logical function in the sense that multiple nodes of different types can run on the same physical server or blockchain platform 112. Blockchain nodes 102 are grouped in trust domains and are associated with logical entities that control them in various ways. Blockchain nodes 102 may include different types, such as a client node 560 or submitting-client node which submits a transaction-invocation to an endorser (e.g., peer), and broadcasts transaction-proposals to an ordering service (e.g., ordering node).

Another type of node 102 is a peer node 104-110 which can receive client submitted transactions, commit the transactions, and maintain a state and a copy of the ledger of blockchain transactions. Peers 104-110 can also have the role of an endorser, although it is not a requirement. An ordering-service-node or orderer is a node running the communication service for all blockchain nodes 102, and which implements a delivery guarantee, such as a broadcast to each of the peer nodes 104-110 when committing/confirming transactions (including documenting the transfer of digital assets received from a data migration source, data migration target, migration tools 121 and one or more clients devices 119, 123, 127) and modifying a world state of the blockchain, which is another name for the initial blockchain transaction and may normally include control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node(s) 104-110) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

Figure 6:
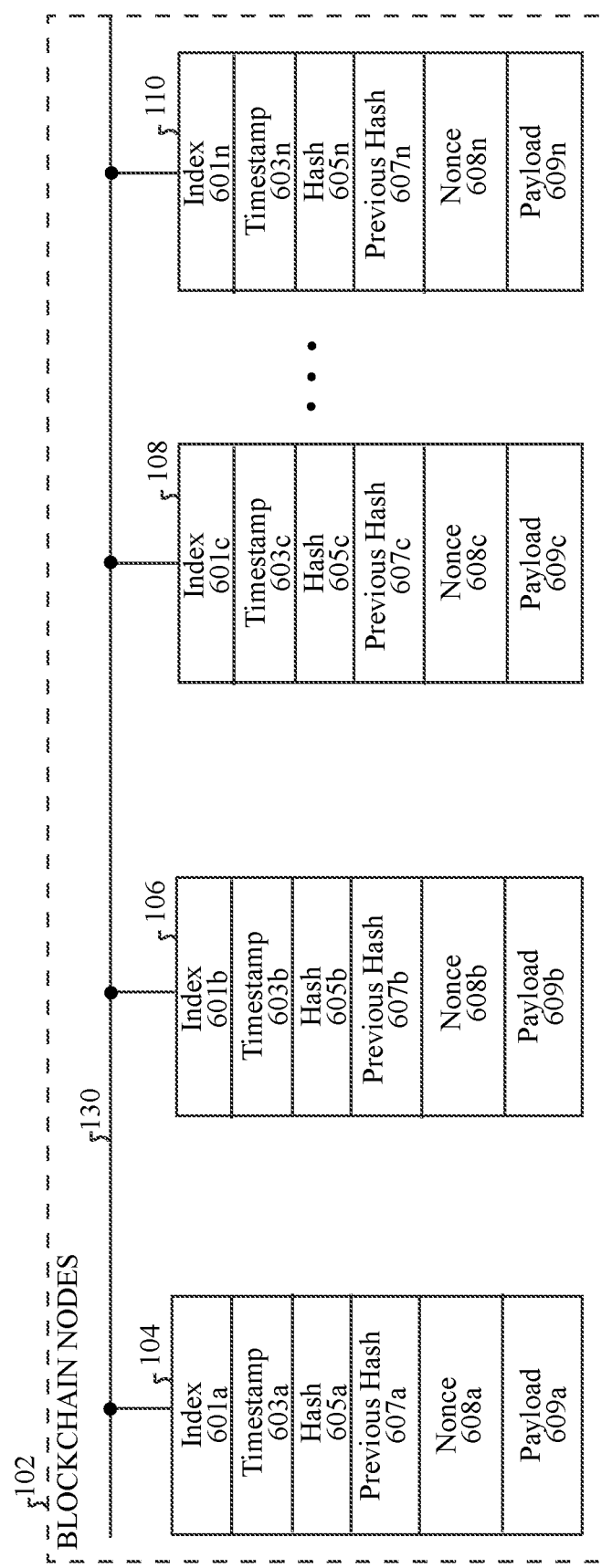
FIG. 6 depicts an example of peer nodes of a blockchain network and one or more contents thereof, in accordance with embodiments of the present disclosure.

In some embodiments, the method, system, and/or computer program product described herein can utilize a chain as a transaction log that is structured as hash-linked blocks (as shown in FIG. 6), and each block contains a sequence of N transactions where N is equal to or greater than one. The block header includes a hash 605a-605n of the block's transactions, as well as a hash 607a-n of the prior block's header. In the instance of the genesis block, the hash of the prior block's head may be zeroed because a prior block may not exist. In view of the hash-linked blocks, all transactions on the ledger may be sequenced and cryptographically linked together. Accordingly, it is not possible to tamper with the ledger data without breaking the hash links. A hash 605 of a most recently added blockchain block represents every transaction on the chain that has come before it, making it possible to ensure that all peer nodes 104-110 are in a consistent and trusted state. The blockchain may be stored on a peer node 104-110 file system (e.g., local, attached storage, cloud, etc.), efficiently supporting the append-only nature of the blockchain workload. FIG. 6 depicts an example of a transaction log that is structured as hash-linked blocks stored by peer nodes 104-110. As shown in FIG. 6, each of the peer nodes 104-110 of the blockchain network 130 comprise not only the linked hash 605a-605n, the previous hash 607a-607n of the prior block as well as a payload 609a-609n (i.e. the digital asset or file being added to the audit trail 129), but also a timestamp 603a-603n identifying the receipt of the time the block was created and/or added to the blockchain, and an index 601a-601n. In some embodiments a nonce 608a-608n may be added to the block stored by each peer node 104-110. A "nonce" may refer to a "number used only once" during cryptographic communication. Embodiments of a nonce 608 may be a random or pseudo random number issued in an authentication protocol when the block is hashed or encrypted to ensure that old communications cannot be reused in a replay attack and if a block in a blockchain is rehashed, the rehashing of the block meets certain difficulty level restrictions to rehash by being assigned a new nonce associated with the rehashed block values.

The current state of the immutable ledger represents the latest values for all keys that are included in the chain transaction log. Since the current state represents the latest key values known to a channel on the blockchain network 130, it is sometimes referred to as a world state. Embodiments of channels allow a specific set of peers, applications 124, and APIs 122 to communicate with each other within a blockchain network 130. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated) upon peer node startup, and before transactions are accepted.

Some benefits of the instant solutions described and depicted herein include a method, system, and computer program product for implementing blockchain to securely create an audit trail 129 of an end-to-end migration event using one or more digital assets describing the performance of one or more end-to-end migration tasks 111. The exemplary embodiments solve the issues of time and trust by extending features of a database such as immutability, digital signatures and being a single source of truth auditing the performance of data migration between the data migration source and the data migration target. The exemplary embodiments provide a solution for generating a secure ledger containing the audit trail 129 on a blockchain accessible via a blockchain platform 112. Embodiments of the blockchain networks 130 may be homogenous based on the type of information being stored (e.g., private information, public information, application or workload specifications, etc.) and rules that govern the assets based on the smart contracts being executed via applications 124 and/or API 122. In some embodiments, due to the nature of the different types of digital assets that may be collected from the various servers 103, 105, migration tools 121, applications 107, workloads 109, and client devices 119, 123, 123, the blockchain networks 130 may be based on the asset type being stored to the audit trail 129 or based on the migration project being added to the audit trail 129 and a cross-blockchain communication protocol may be used for each blockchain network to communicate with one another in synchronicity. In other embodiments, each chain in a blockchain network 130 may be associated with an asset type and rules governing the asset type may be combined via the chains communicating via a cross-chain communication protocol.

It is noted that blockchain is different from a traditional database in that blockchain is not a central storage, but rather a decentralized, immutable, and secure storage, where nodes 102 may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data that comprises the audit trail 129 is immutable, which provides for an efficient method for securely auditing the performance of one or more end-to-end tasks 111 while conducting an end-to-end migration of data between a data migration source and a data migration target. Also, use of the encryption in the blockchain provides security and builds trust. The smart contract manages the state of the digital assets added to the audit trail 129. The example blockchains are permission decentralized. Thus, each end user, administrator and/or auditor of and end-to-end data migration project may have access to their own copy of the ledger. Multiple stakeholders, including different organizations, entities (and peers) responsible for auditing or performing a portion of the tasks 111 may be on-boarded on to the blockchain network 130. The key organizations may serve as endorsing peers to validate the smart contract execution results, read-set and write-set. In other words, the blockchain inherent features provide for efficient implementation of auditing the end-to-end migration of data between the source and target using the blockchain platform 112 by stakeholders, to track the progress and performance of the end-to-end migration tasks 111.

One of the benefits of the exemplary embodiments described herein, is that blockchain improves the functionality of one or more data processing systems 10 implementing a data migration audit trail 129 using a blockchain network 130 (e.g., by implementing transfer compliance validator/node in the blockchain network 130 which can facilitate the collection and endorsement of multiple signatures needed to confirm the acceptance of the performance of one or more end-to-end migration tasks 111 to the audit trail 129). Through the blockchain system described herein, the data processing systems of computing environment 200, 240, 300, 500, 550 (or a processor of the data processing system(s) 10) can perform functionality for tracking the progression of end-to-end data migration between a source and target system and/or a cloud network 250 utilizing blockchain networks 130 by providing access to capabilities of the blockchain platform 112 such as a distributed ledger, peers, encryption technologies, event handling, etc. Also, the blockchain platform 112 enables the creation of a business network and make any stakeholders, including users, entities or organizations to the end-to-end migration event, on-board for participation (e.g., be incorporated with an immutable ledger, be a verified/trusted party, etc.). As such, the blockchain is not just a database; the blockchain comes with capabilities to create a network of users, entities, on-board/off-board organizations and other stakeholders that can collaborate and execute service processes in the form of smart contracts executing transactions that query and update the ledger comprising the audit trail 129 with digital assets describing the end-to-end migration tasks. Moreover, query transactions allow for inspection of the ledger by auditors in order to monitor the progress and performance of one or more end-to-end data migration tasks.

Embodiments of traditional databases could not be used to implement the embodiments described herein, because traditional databases are unable to bring all stakeholders participating in the end-to-end migration onto the blockchain network 130, traditional databases do not create trusted collaboration and do not provide for an tamper-proof storage and preservation of the logs, alerts, records and other digital assets recorded to the blockchain ledger. Thus, the proposed embodiments described herein utilizing blockchain networks 130 cannot be implemented by a traditional database. Moreover, if a traditional database were to be used to implement the example embodiments, the example embodiments described herein would suffer from unnecessary drawbacks such as lack of security, and a lack of a single unified consensus of the ledger comprising the audit trail 129 describing the status of the end-to-end migration tasks 111. Accordingly, the example embodiments provide for a specific solution to a problem in the arts/field of auditing data migration between data migration sources and data migration targets.

Figure 5A:
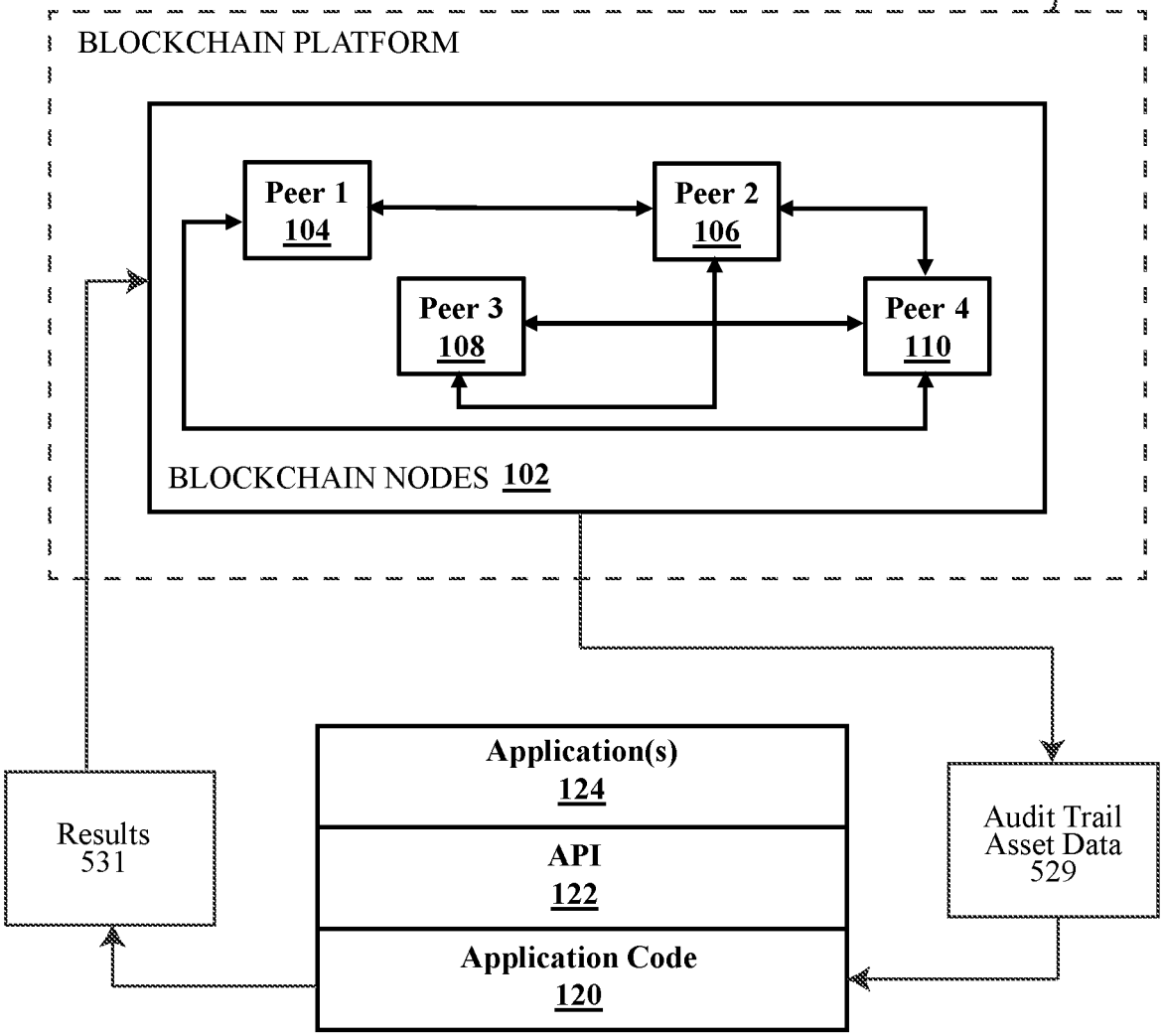
FIG. 5A illustrates an example blockchain architecture, in accordance with embodiments of the present disclosure.

Turning now to the blockchain platform 112 of FIGS. 2A-2B and the blockchain architecture 500 of FIG. 5A, embodiments of the blockchain platform 112, may include certain blockchain elements, for example, a group of blockchain nodes 102. The blockchain nodes 102 may include one or more peers 104-110 (these four nodes are depicted by example only). These nodes 102 participate in several activities, such as a blockchain transaction addition and validation process (consensus). One or more of the peers 104-110 may endorse and/or recommend transactions (such as recording one or more digital assets as blocks to the blockchain) based on an endorsement policy and may provide an ordering service for all blockchain nodes 102 in the blockchain architecture 500. A blockchain node 102 may initiate a blockchain authentication and seek to write to a blockchain immutable ledger stored in blockchain layer 116, a copy of which may also be stored on the and/or data layer 128, or underpinning physical infrastructure 114. The blockchain configuration may include one or more blockchain applications 124 which may be linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. Application code 120 can be deployed as a transaction and installed, via appending to the distributed ledger, on all blockchain nodes 102 and peers 104-110 thereof. For example, application code 120 may run chaincode that queries the audit trail 129 in its current state based on the ledger of a queried peer, and/or application code 120 that updates the audit trail 129 with one or more new records, logs, events, alerts, etc., with the consensus of the peers on a particular channel of the blockchain network 130.

Embodiments of the blockchain platform 112 may include various layers, such as a blockchain data layer 128, services layer 118 (e.g., cryptographic trust services, virtual execution environment, etc.), and underpinning physical computer infrastructure 114 layer that may be used to receive and store new transactions onto the blockchain that make up the audit trail 129 and provide access to auditors (for example via an audit client device 127) which are seeking to query the audit trail's 129 data. The blockchain layer 116 may expose an interface that provides access to the virtual execution environment necessary to process the application code 120 and engage the physical infrastructure 114. Cryptographic trust services may be used to verify transactions such as asset exchange transactions and keep transactional information private.

The blockchain architecture 500 may process and execute application code 120 by way of API 122, via one or more interfaces exposed in the blockchain layer 116, and services provided by blockchain platform 112 in the services layer 118. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be created to execute the transfer of resources, and/or the generation of resources. The smart contracts can themselves be used to identify rules associated with authorization (e.g., asset delivery rules, storage, restrictions, etc.), access requirements (e.g., of a datastore, an off-chain datastore, etc.), and/or usage of the ledger to create or append the audit trail 129. For example, the audit trail asset data 529 may be processed by one or more processing entities (e.g., virtual machines) included in the blockchain layer 116. The result 531 outputted may include a plurality of linked shared documents (e.g., with each linked shared document recording the issuance of a smart contract in regard to the audit trail asset data 529 being identified as either being approved or denied addition to the blockchain), including the documents and files that may be containing the logs, records, alerts, error reports and other digital assets transmitted to the blockchain platform 112 via the API 122. In some embodiments, the physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a blockchain's ledger. The modification(s) to the blockchain ledger caused by the smart contract execution may be automatically replicated throughout the distributed network of blockchain peers 104-110 through one or more consensus protocols.

The smart contract may write data to the blockchain in the format of key-value pairs. Furthermore, the smart contract code can read the values stored in a blockchain and use them in application operations, for example to generate user-friendly reports about audit trail 129 and deliver the reports to a blockchain application 124 installed on a user client device 124. Embodiments of smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be application code 120 deployed on a computing network, where it is executed and validated by chain validators together during a consensus process. The chaincode receives a hash 605 and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus confirming a transfer of the digital asset such as a log, record, alert or event to the audit trail 129; or identifying a discrepancy with a perspective transfer of a digital asset, etc.).

Figure 5B:
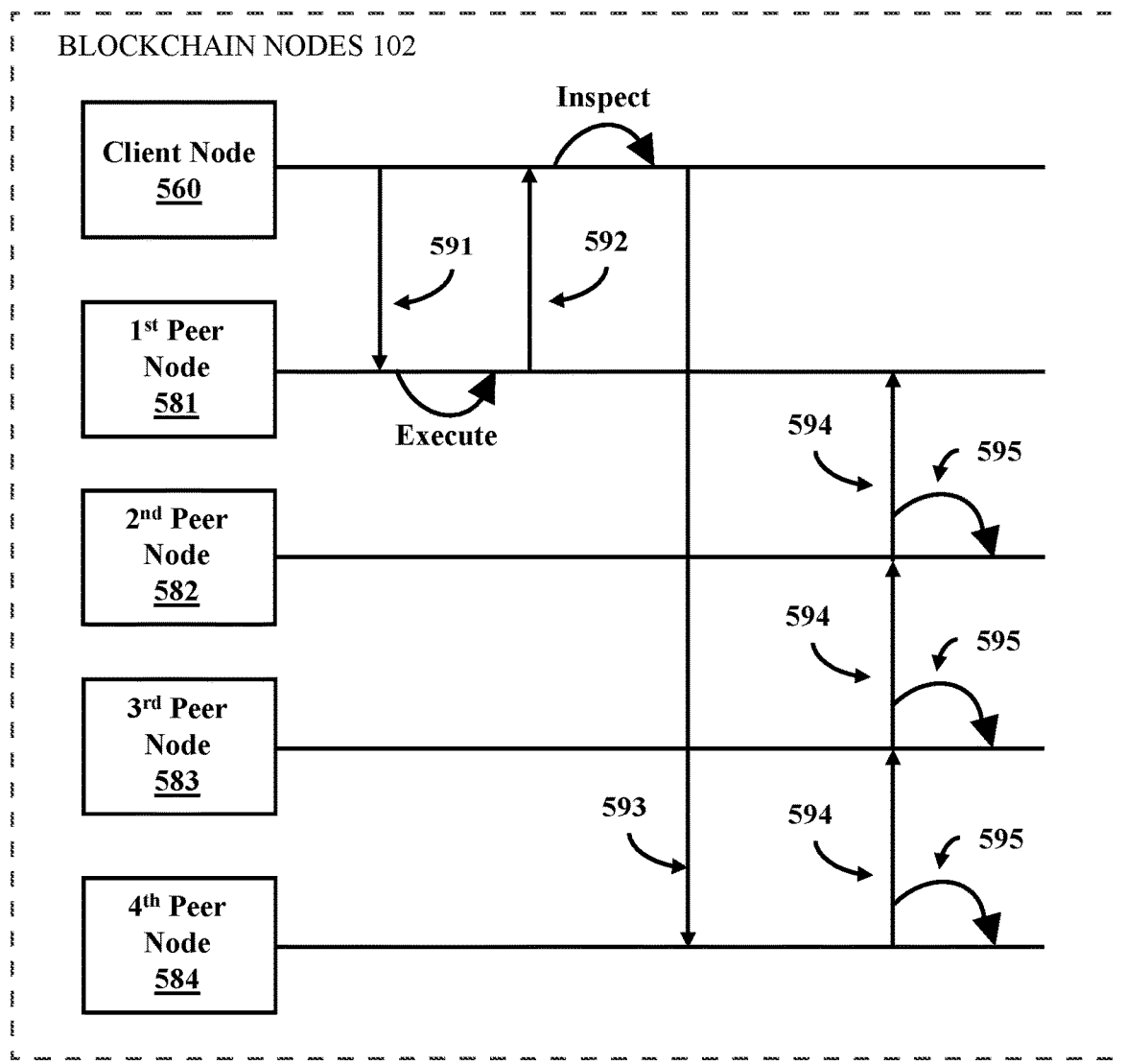
FIG. 5B illustrates a blockchain transactional flow, in accordance with embodiments of the present disclosure.

FIG. 5B illustrates an example of a blockchain transactional flow 550 between nodes 102 of the blockchain network 130, for example by nodes 102 of a peer to peer (p2p) network. The transaction flow 550 may include a transaction proposal 591 sent by an application client node 560 to an endorsing peer node 581 (e.g. in some embodiments the transaction proposal 591 may be a request that includes an identifier associated with an off-chain datastore or database). The endorsing peer node 581 may verify the client signature and execute a chaincode function to initiate the proposed transaction. For example, a proposed transaction to record a log from the migration tools 121 to a block and entering the block into the audit trail 129 blockchain. The output may include the chaincode results, a set of key/value versions that were read in the chaincode (read set), and the set of keys/values that were written in chaincode (write set). The proposal response 592 is sent back to the client node 560 along with an endorsement signature (if approved). The client node 560 assembles the endorsements into a transaction payload 593 and broadcasts the payload 593 to an ordering service node 584. The ordering service node 584 then delivers ordered transactions as blocks to all peers 581-583 on a channel. Before committal to the blockchain, each peer 581-583 may validate the transaction. For example, the peers 581-583 may check the endorsement policy to ensure that the correct allotment of the specified peers have signed the results and authenticated the signatures against the transaction payload 593 (e.g., all, or a threshold number of peers, validate that the request includes the identifier and/or symmetric key that allows the finding of a datastore connection object and/or access to an off-chain database storing the digital asset).

Embodiments of the client node 560 initiates the transaction proposal 591 by constructing and sending a request to the peer node 581, which is an endorser. The client node 560 may include an application leveraging a supported software development kit (SDK), which utilizes an available API 122 to connect to the peers and invoke chaincode to generate a transaction proposal 591. Through a peer connection, applications 124 and/or API 122 can execute chaincodes to query or update a ledger. The result of a ledger query transaction is returned immediately, whereas ledger updates involve a more complex interaction between applications, peers and orderers (described in detail herein). The transaction proposal 591 is a request to invoke a chaincode function so that data can be read and/or written to the ledger (e.g., write new key value pairs for the assets being added to the audit trail 129). The SDK may reduce the package of the transaction proposal 591 into a properly architected format (e.g., protocol buffer over a remote procedure call (RPC)) and take the client node's 560 cryptographic credentials to produce a unique signature for the transaction proposal 591.

In response, the endorsing peer node 581 may verify (a) that the transaction proposal 591 to add the digital asset to the block comprising the audit trail 129 is well formed, (b) the transaction has not been submitted already in the past (replay-attack protection), (c) the signature is valid, and (d) that the submitter (client node 560, in this example) is properly authorized to perform the proposed operation on that channel of the blockchain network 130. The endorsing peer node 581 may take the transaction proposal 591 inputs as arguments to the invoked chaincode function. The chaincode is then executed against a current state database to produce transaction results including a response value, read set, and write set. However, no updates are made to the ledger of the blockchain's nodes 102 at this point. In some embodiments, the set of values, along with the endorsing peer node's 581 signature is passed back as a proposal response 592 to the SDK of the client node 560 which parses the payload 593 for the application 124 and/or API 122 to consume and display.

In response, the application of the client node 560 inspects/verifies the endorsing peers' signatures and compares the proposal responses to determine if the proposal response is the same. If the chaincode only queried the ledger, the application inspects the query response and would typically not submit the transaction to the ordering node 584 service. If the client node 560 intends to submit the transaction to the ordering node 584 service to update the ledger, the client node 560 determines if the specified endorsement policy has been fulfilled before submitting (e.g., has a request been accepted). Here, client nodes 560 may include only one of multiple parties or stakeholders to the transaction to add the digital assets to the block of the audit trail 129. In this case, each individual client node 560 may have their own endorsing peer, and each endorsing peer will need to endorse the transaction. The architecture is such that even if a client node 560 selects not to inspect responses or otherwise forwards an unendorsed transaction, the endorsement policy will still be enforced by peers and upheld at the commit validation phase.

After successful inspection, in the transaction payload 593 step, the client node 560 assembles endorsements into a transaction and broadcasts the transaction proposal 591 and response within a transaction message to the ordering node 584. The transaction may contain the read/write sets, the endorsing peers' signatures and a channel ID. The ordering node 584 does not need to inspect the entire content of a transaction in order to perform its operation, instead the ordering node 584 may simply receive transactions from all channels of the network, order them chronologically by channel, and create blocks of transactions per channel.

The blocks of the transaction are delivered from the ordering node (the 4' peer node 584 in the example of FIG. 5B and referred to herein as the "ordering node 584") to all peer nodes 581-583 on the channel. The transactions 594 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 595 each peer node 581-583 appends the block to the channel's chain, and for each valid transaction, the write sets are committed to current state database. An event is emitted, to notify the client node's 560 application that the transaction (invocation) has been immutably appended to the chain, as well as to notify whether the transaction was validated or invalidated (e.g., whether the request is allowed or denied the update to the audit trail 129 which may include an addition of new digital asset transmitted to the blockchain platform 112 from one or more servers 103, 105, migration tools 121, and/or client devices 119, 123, 127).

Method for Executing a Blockchain-Implemented Data Migration Audit Trail

Figure 7:
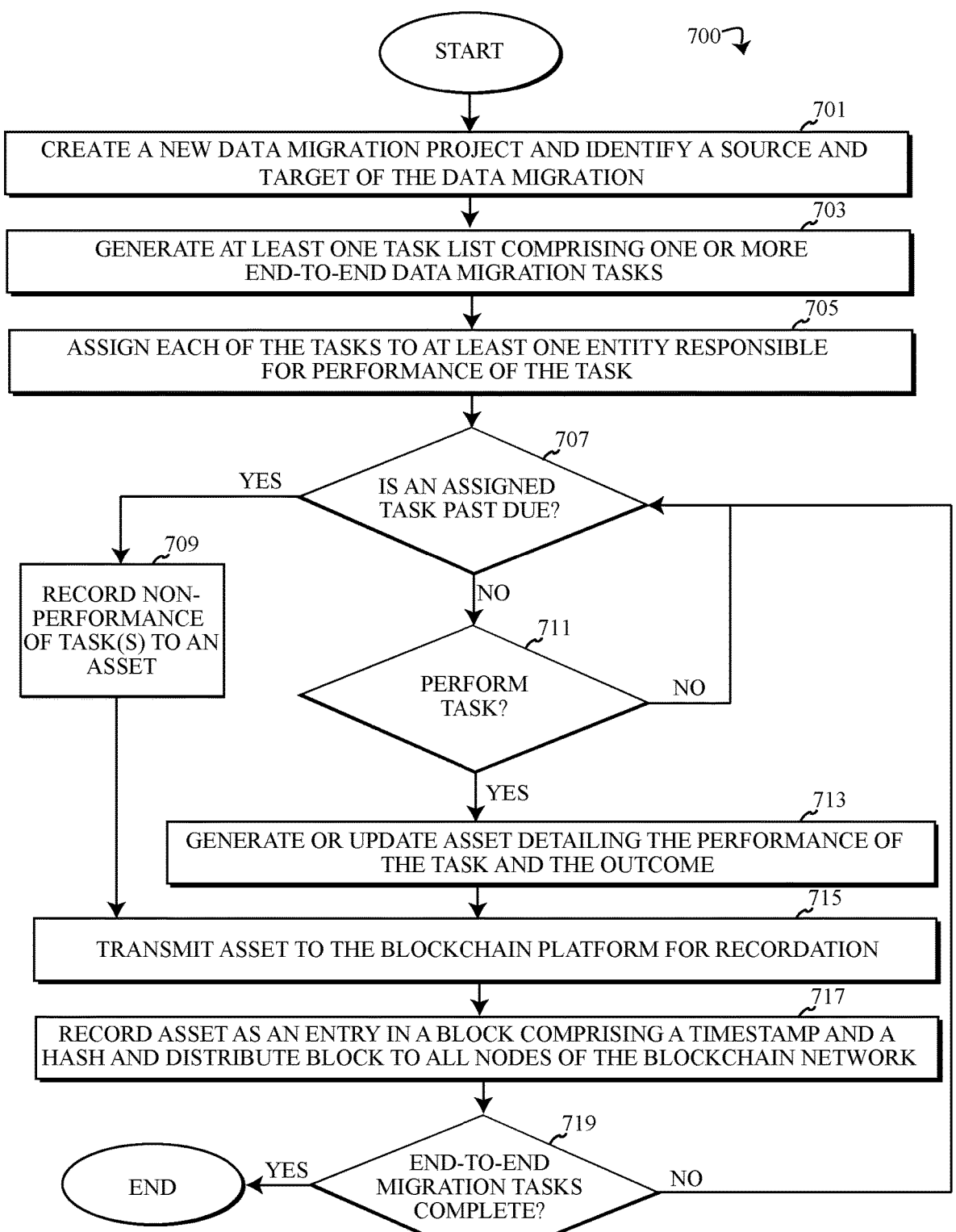
FIG. 7 depicts a block diagram of an embodiment of a method for executing a blockchain-implemented data migration audit trail, in accordance with the present disclosure

The drawing of FIG. 7 represents an embodiment of an algorithm 700 performing a computer-implemented method for executing a blockchain-implemented data migration audit trail 129 capable of securely tracking progress of end-to-end migration tasks 111. The algorithm 700, as shown and described by FIG. 7, may use one or more computer systems, defined generically by data processing system 10 of FIG. 1, and more specifically by the embodiments of specialized data processing systems of computing environments 200, 240, 300, 500, 550 depicted in FIGS. 2A-6 and as described herein. A person skilled in the art should recognize that the steps of the algorithm 700 described in FIG. 7 may be performed in a different order than presented. The algorithm 700 may not necessarily require all the steps described herein to be performed. Rather, some embodiments of algorithm 700 may alter the methods by performing a subset of steps using one or more of the steps discussed below.

Embodiments of the algorithm 700 may begin at step 701. In step 701, a user, owner, administrator, entity, or other stakeholder with authority to authorize data migration of data stored by one or more data migration sources to create and/or authorize a new data migration project. The user authorizing and/or creating the data migration project may identify the data migration source responsible for transferring data, such as a source datacenter 101 or cloud network 250 and a target data source, such as target datacenter 125 or a second cloud network, designated to be receiving the data being migrated from the data migration source.

In step 703 of algorithm 700, a task list 111 may be generated and/or distributed to each of the stakeholders, and/or participants that may be participating or contributing to the data migration project created in step 701. The generated task list 111 may comprise one or more end-to-end migration tasks for preparing, transferring and validating a successful migration of data between the data migration source and the data migration target. Embodiments of the end-to-end migration task list 111 may include one or more pre-migration tasks 113, migration tasks 115 and/or post-migration tasks 117. In step 705, one or more tasks 111 of the task list generated in step 703 may be assigned to one or more stakeholders such as a particular team of participants responsible for performing the assigned task of the task list 111. Moreover, in addition to the assigned task, the task list 111 may further comprise a schedule for completing the task by a deadline and a designation of one or more dependent tasks that may require completion of the assigned task before the dependent tasks can be completed.

In step 707 of algorithm 700, a determination is made whether or not one or more of the assigned tasks of the data migration projects are overdue by comparing the due date scheduled for the completion of the task against the current date the determination is made. If an assigned task has not been performed and is past the assigned due date scheduled by the task list generated in step 703, the algorithm may proceed to step 709, wherein the non-performance of the task(s) past the due date are recorded to a digital asset, such as a log file, event record, alert, etc. The component, program, server 103, 105, migration tools 121 or other resources recording the non-performance of assigned task may initiate a transaction to add the digital asset indicating non-performance of the task to the audit trail 129 maintained by blockchain platform 112. For example, the resource(s) generating the digital asset indicating non-performance of the task, may execute application code 120 via API 122 and/or application 124 requesting the ledger maintaining the audit trail 129 be updated to include the non-performance asset. In particular, a client node receiving the request to update the ledger, may execute chaincode propagating the execution of the update request with the peers 104-110 of the blockchain network 130.

Conversely, if in step 707, the determination of whether an assigned task 111 is not past due, a second determination may be made whether one or more tasks 111 have been performed within the computing environment 200, 250, as part of the end-to-end migration project created in step 701. If tasks 111 have not been performed in step 711, the algorithm 700 may return to step 707. Likewise, if in step 711, the performance of one or more tasks 111 has occurred, the algorithm 700 may proceed to step 713. In step 713, upon performance of a task by one or more resources of the computing environment 200, 250, such as by application(s) 107, workloads 109, migration tools 121, servers 103, 105 and/or client devices 119, 124, 127, the one or more resources of the computing environment may generate and/or update a digital asset, such as a log, alert, error report, event record, etc. detailing the performance of the task 111, the outcome and one or more additional details that may provide context for the performance of the task 111 (i.e. identify when the task was performed, which resource performed the task, when the task was performed, user name, network, ip address, etc.). For example, the digital asset logging the performance of the task(s) may be an application log, operating system log, output from one or more migration tools 121, user access logs and/or network device logs from clients 119, 123, 127 or servers 103, 105.

In step 715 of algorithm 700, the digital assets generated by one or more resources of the computing environments 200, 240 may transmit the asset, along with a transaction proposal to update the ledger of the audit trail 129 in order to accurately reflect the performance of the one or more tasks 111 on the blockchain maintaining the audit trail 129. For example, one or more resources of the computer environment 200, 240 generating the asset may forward the request through an application 124 and/or an API 122 to the blockchain platform 112. The application 124 and/or API 122 in response to the receipt of the transaction proposal to update the ledger of the blockchain comprising the audit trail 129, may execute application code 120 in order to process the request with one or more peer nodes 104-110. For example, through the API 122, the resource seeking to update the blockchain makes a peer connection with one or more peer nodes 104-110 of the blockchain network 130 and the application code 120 invokes chaincode to prompt the peer node 104-110 to update the blockchain comprising audit trail 129 with the digital asset being provided which details the performance of the task 111. The invoked chaincode may generate an update proposal response which may be retuned the application 124 or API 122 sending the initial update request.

In step 717 of the algorithm 700, recordation of the digital asset indicating performance of one or more tasks may be entered onto the blockchain comprising the audit trail 129 as a block in the blockchain. For example, upon receipt of the proposal response from the peer node via the application 124 or API 122, the application 124 and/or API can order the update transaction be performed by sending the transaction request to an ordering node of the blockchain network 130. The ordering node may collect the transactions from across the blockchain network 130 into blocks which may comprise an index 601, a timestamp 603, a hash 605 a previous hash 607 of a prior block, a nonce 608 and/or a payload 609 comprising the digital asset detailing the performance (or non-performance of an end-to-end migration task). Embodiments of the ordering node of the blockchain network 130 may distribute the blocks for the requested transaction to all peers on the blockchain network 130 (or the particular channel of the blockchain network), including the peer node receiving the original update request which invoked the chaincode to update the ledger comprising the audit trail 129. The peer nodes 104-110 may validate the blocks received from the ordering node and if the update request is considered valid, each peer node receiving a block from the ordering node may update their copy of the ledger of the audit trail 129 maintained by each peer node 104-110 (if a consensus was reached by the peer nodes 104-110 to perform the update transaction). In some embodiments, upon a validated update of the ledger comprising the audit trail 129, peer nodes 104-110 may generate an event to signify the completion of the update transaction and transmit the event to the application 124 or API 122 that generated the initial transaction request.

In step 719 of algorithm 700, a determination may be made whether each of the end-to-end migration tasks 111 have been completed. If the end-to-end migration tasks 111 generated in step 703 have all been completed, the algorithm 700 may end. Conversely, if there are still additional unperformed end-to-end migration tasks 111 of the data migration project, the algorithm 700 may proceed from step 719 back to step 707.

In some embodiments, an auditor of the end-to-end migration tasks 111 may attempt to inspect the ledger comprising the audit trail 129 at any point in time the performance of the tasks 111 have been scheduled or completed, including upon completion of all end-to-end migration tasks 111. Auditors may access the ledger comprising the audit trail, for example, via an audit client device 127 by establishing a peer connection with a peer node 104-110 using an application 124 and/or via API 122 and submitting a query request to receive a copy of the ledger maintained by the peer node with the established peer connection. The query request submitted via the application 124 and/or API 122 may execute application code 120 invoking chaincode of the peer node to perform the query request. The chaincode generates the query result of the ledger and returns a copy of the ledger comprising the audit trail 129 to the auditor's client device 127 for review and analysis by the auditor. In some embodiments, the auditor may utilize the copy of the ledger comprising the audit trail 129 to prepare one or more report detailing the status and performance of the end-to-end migration tasks, and may transmit the generated reports to one or more client devices 119, 123, 127.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a blockchain-implemented data migration audit trail comprising:
    receiving, by a processor of a first participant of a plurality of participants in a data migration project, a task list configured to delegate tasks for migrating data from a data migration source to a data migration target;
    receiving, by the processor of the first participant, through an application programming interface (API), an update request for a digital asset to be added to a blockchain audit trail for the data migration project, automatically from a resource executing a performance of one of the tasks of the data migration project, the digital asset including log data regarding the performance of one of the tasks of the data migration project;
    receiving, by the processor of the first participant, a first block of a plurality of blocks from an ordering node, wherein the first block comprises the digital asset and the ordering node distributes the plurality of blocks to respective nodes in a blockchain network;
    updating, by the processor of the first participant, the blockchain audit trail for the data migration project with the first block; and
    generating, by the processor of the first participant, and transmitting through the API, an event indicating completion of the updating the blockchain audit trail.

2. The computer-implemented method of claim 1, wherein content of the digital asset logs is selected from the group consisting of event logs, application logs, operating system logs, user access logs, system alerts, network device logs and output from data migration tools.

3. The computer-implemented method of claim 1, further comprising:
    establishing, by the processor of the first participant, a peer connection with one of the nodes of the blockchain network using the API communicating with a blockchain platform hosting the blockchain network; and
    invoking, by the processor of the first participant, chaincode of the one of the nodes of the blockchain network to update the blockchain audit trail with the first block, wherein the first block is generated by at least one of a logging server or a monitoring server of the data migration source or the data migration target, or data migration tools.

4. The computer-implemented method of claim 3, wherein the first block further comprises a timestamp of the digital asset, a hash of transactions of the first block, and a previous hash describing an immediately prior-recorded block in the blockchain network.

5. The computer-implemented method of claim 1, wherein the data migration source and the data migration target are each selected from the group consisting of a datacenter, a public cloud network and a private cloud network.

6. The computer-implemented method of claim 1, further comprising:
    establishing, by the processor of the first participant, a peer connection to one of the nodes in the blockchain network using the API communicating with a blockchain platform hosting the blockchain network;
    querying, by the processor of the first participant, the one of the nodes in the blockchain network for a copy of the blockchain audit trail;
    generating, by the processor of the first participant, a report describing progress of at least one of the tasks for migrating data from the data migration source to the data migration target based on the blockchain audit trail; and
    distributing, by the processor of the first participant, the report to one or more client devices of the data migration source or the data migration target.

7. The computer-implemented method of claim 1, wherein the blockchain network is a peer-to-peer (p2p) network and each node of the nodes of the p2p network receiving one of the plurality of blocks from the ordering node verifies the one of the plurality of blocks has not been tampered, and adds the one of the plurality of blocks to an existing blockchain of the blockchain network.

8. A computer system for generating a blockchain-implemented data migration audit trail comprising:
    a processor of a first participant of a plurality of participants in a data migration project; and
    a computer-readable storage media coupled to the processor of the first participant, wherein the computer-readable storage media contains program instructions executing a computer-implemented method comprising:
    receiving, by the processor of the first participant, a task list configured to delegate tasks for migrating data from a data migration source to a data migration target of nodes in a blockchain network, the nodes including the processor of the first participant;
    receiving, by the processor of the first participant, from another node of the nodes in the blockchain network through an application programming interface (API), an update request for a digital asset to be added to a blockchain audit trail for the data migration project, automatically from a resource executing a performance of one of the tasks of the data migration project, the digital asset including log data regarding the performance of one of the tasks of the data migration project;

receiving, by the processor of the first participant, a first block of a plurality of blocks from an ordering node, wherein the first block comprises the digital asset and the ordering node distributes the plurality of blocks to respective ones of the nodes in the blockchain network;

updating, by the processor of the first participant, the blockchain audit trail for the data migration project with the first block; and generating, by the processor of the first participant, and transmitting through the API, an event indicating completion of the updating the blockchain audit trail.

9. The computer system of claim 8, wherein content of the digital asset logs is selected from the group consisting of event logs, application logs, operating system logs, user access logs, system alerts, network device logs and output from data migration tools.

10. The computer system of claim 8, further comprising:
establishing, by the processor of the first participant, a peer connection with one of the nodes of the blockchain network using the API communicating with a blockchain platform hosting the blockchain network; and
invoking, by the processor of the first participant, chaincode of the one of the nodes of the blockchain network to update the blockchain audit trail with the first block, wherein the first block is generated by at least one of a logging server or a monitoring server of the data migration source or the data migration target, or data migration tools.

11. The computer system of claim 10, wherein the first block further comprises a timestamp of the digital asset, a hash of transactions of the first block, and a previous hash describing an immediately prior-recorded block in the blockchain network.

12. The computer system of claim 9, wherein the data migration source and the data migration target are each selected from the group consisting of a datacenter, a public cloud network and a private cloud network.

13. The computer system of claim 8, further comprising:
establishing, by the processor of the first participant, a peer connection to one of the nodes in the blockchain network using the API communicating with a blockchain platform hosting the blockchain network;
querying, by the processor of the first participant, the one of the nodes in the blockchain network for a copy of the blockchain audit trail;
generating, by the processor of the first participant, a report describing progress of at least one of the tasks for migrating data from the data migration source to the data migration target based on the blockchain audit trail; and
distributing, by the processor of the first participant, the report to one or more client devices of the data migration source or the data migration target.

14. The computer system of claim 8, wherein the blockchain network is a peer-to-peer (p2p) network and each node of the nodes of the p2p network receiving one of the plurality of blocks from the ordering node verifies the one of the plurality of blocks has not been tampered, and adds the one of the plurality of blocks to an existing blockchain of the blockchain network.

15. A computer program product comprising:
a computer readable storage medium having program instructions embodied therewith, the program instructions executable by a processor of a first participant of a plurality of participants in a data migration project to cause the processor of the first participant to execute a computer-implemented method for creating a blockchain-implemented data migration audit trail comprising:
receiving, by the processor of the first participant, a task list configured to delegate tasks for migrating data from a data migration source to a data migration target;
receiving, by the processor of the first participant through an application programming interface (API), an update request for a digital asset to be added to a blockchain audit trail for the data migration project, automatically from a resource executing a performance of one of the tasks of the data migration project, the digital asset including log data regarding the performance of one of the tasks of the data migration project;
receiving, by the processor of the first participant, a first block of a plurality of blocks from an ordering node, wherein the first block comprises the digital asset and the ordering node distributes the plurality of blocks to respective nodes in a blockchain network;
updating, by the processor of the first participant, the blockchain audit trail for the data migration project with the first block;
generating, by the processor of the first participant, and transmitting through the API, an event indicating completion of the updating the blockchain audit trail.

16. The computer program product of claim 15, wherein content of the digital asset is selected from the group consisting of event logs, application logs, operating system logs, user access logs, system alerts, network device logs and output from data migration tools.

17. The computer program product of claim 15, further comprising:
establishing, by the processor of the first participant, a peer connection with a one of the nodes of the blockchain network using the API communicating with a blockchain platform hosting the blockchain network; and
invoking, by the processor of the first participant, chaincode of the one of the nodes of the blockchain network to update the blockchain audit trail with the first block, wherein the first block is generated by at least one of a logging server or a monitoring server of the data migration source or the data migration target, or data migration tools.

18. The computer program product of claim 17, wherein the first block further comprises a timestamp of the digital asset, a hash of transactions of the first block, and a previous hash describing an immediately prior-recorded block in the blockchain network.

19. The computer program product of claim 15, further comprising:
establishing, by the processor of the first participant, a peer connection to one of the nodes in the blockchain network using the API communicating with a blockchain platform hosting the blockchain network;
querying, by the processor of the first participant, the one of the nodes in the blockchain network for a copy of the blockchain audit trail;
generating, by the processor of the first participant, a report describing progress of at least one of the tasks for migrating data from the data migration source to the data migration target based on the blockchain audit trail; and distributing, by the processor of the first participant, the report to one or more client devices of the data migration source or the data migration target.

20. The computer program product of claim 15, wherein the blockchain network is a peer-to-peer (p2p) network and each node of the nodes of the p2p network receiving one of the plurality of blocks from the ordering node verifies the one of the plurality of blocks has not been tampered, and adds the one of the plurality of blocks to an existing blockchain of the blockchain network.

* * * * *